June 6, 1961
M. THOMA
2,987,378
PROCESS FOR THE PRODUCTION OF HALOGENS FROM HYDROHALIDES
Filed Oct. 15, 1958
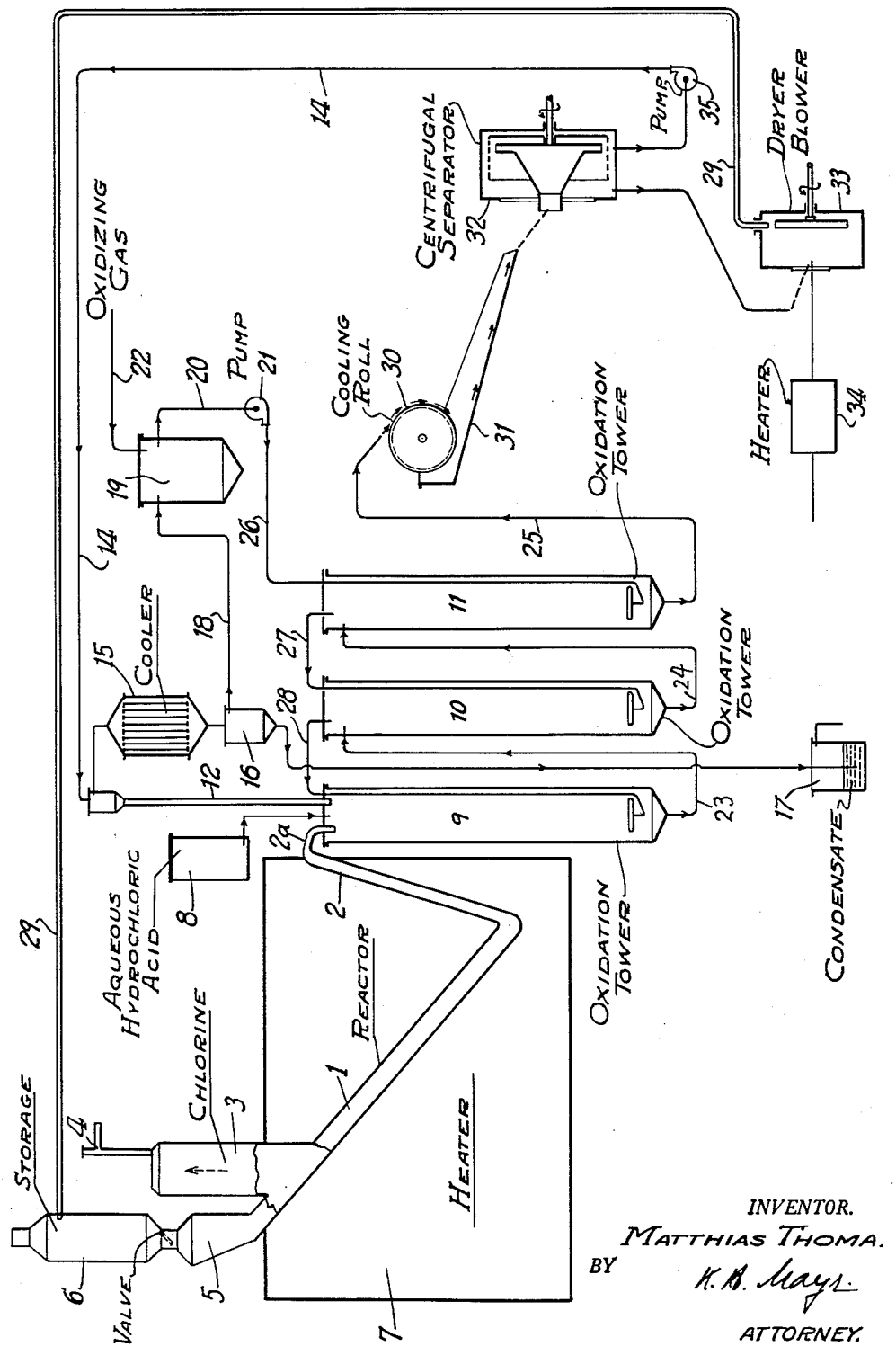
INVENTOR.
MATTHIAS THOMA.
BY
K. B. Mayr
ATTORNEY.

2,987,378
PROCESS FOR THE PRODUCTION OF HALOGENS FROM HYDROHALIDES

Matthias Thoma, 401 Johann-Strauss-Strasse, Waldkraiburg, Germany
Filed Oct. 15, 1958, Ser. No. 767,438
Claims priority, application Germany Oct. 17, 1957
1 Claim. (Cl. 23—219)

The present invention relates to a new and improved process for the preparation of halogens in a highly purified form from the corresponding hydrohalide.

An important object if this invention is the provision of an efficient and economical process for the production of halogens of a high order of purity, and in which the corresponding hydrohalide is employed as the source of the halogen which is produced.

Other objects of this invention will appear from the following detailed description.

The processes hitherto known for the production of halogens from their hydrohalides involved either the oxidation of the hydrohalide with nitric acid or with a mixture of nitric acid and sulfuric acid or a modification of the "Deacon" process in which hydrogen chloride is catalytically oxidized. In general, the processes hitherto employed utilized a hydrohalide in the vapor state. Also, the halogen obtained was produced in a relatively dilute form. In producing chlorine, for example, the chlorine contained impurities such as hydrochloric acid, as well as oxygen or air, so that the use of some method for the purification of the halogen was required.

In addition, the conversion of the aqueous mixture of chlorine and hydrogen chloride in tthe particular oxidation process mentioned above has been found to amount only to about 70% in view of the equilibrium conditions which exist. Also the hydrogen chloride which dissolves in the aqueous reaction medium formed is separated in the form of an aqueous hydrochloric acid solution and in this form cannot be further utilized in the reaction for conversion to chlorine.

It has now been found that hydrochloric acid in any available concentration can be oxidized to form chlorine efficiently and economically and to yield chlorine of a purity of 98% to 100%. This high order of purity is obtained without any further purification. In the novel process of the present invention it is immaterial whether oxygen, air or other suitable oxidizing agent is employed. In addition, by the present process a 100% conversion of hydrogen chloride to chlorine can be obtained regardless of whether gaseous hydrogen chloride or aqueous hydrochloric acid is employed. However, in the instant fusion process the equipment employed should be constructed entirely of materials resistant to the corrosive action of copper salts since the use of any other material will produce only small yields of the desired chlorine or other halogen.

The novel process of this invention comprises a two-stage reaction in which cupric chloride is heated in the first stage to a temperature of 400° C. to 650° C. to effect the thermal decomposition of the cupric chloride to cuprous chloride and free chlorine, and the cuprous chloride formed is then oxidized with gaseous oxygen in the presence of hydrogen chloride so as to convert it again to cupric chloride with water being formed as a by-product of the reaction. The reaction proceeds in accordance with the following equations:

$$2CuCl_2 \xrightarrow{400° C.-650° C.} 2CuCl + Cl_2$$
$$2CuCl + 2HCl + \tfrac{1}{2}O_2 = 2CuCl_2 + H_2O$$

At a reaction temperature of 400° C.–650° C. cupric chloride yields chlorine which is easily recovered in a purity of 98%–100%. The cuprous chloride is then dissolved in an aqueous cupric chloride solution containing hydrochloric acid where it is converted back to cupric chloride by oxidizing it with an oxidizing agent, such as air or oxygen while at a temperature of 80° C.–100° C.

By employing an aqueous solution of cupric chloride which is saturated at 20° C. in admixture with the hydrochloric acid which takes part in the oxidation reaction, rapid and complete solution of the substantially water-insoluble cupric chloride takes place where the temperature of the aqueous solution is raised. Since, as indicated by the literature, cupric chloride has a solubility at about 20° C. of 23% and of about 48% at 80° C. to 100° C. it is, therefore, possible to effect the oxidation of very substantial quantities of cuprous chloride in each volume of the cupric chloride solution due to the increased solubility of the cupric chloride at the higher temperature.

In order to separate the cupric chloride in solution without the excessive expenditure or application of energy and without the necessity for the removal of water by vaporization or evaporation, or the like, and to make the cupric chloride available for the fusion and heating step, the solution obtained after the oxidation step is completed, which comprises an equeous solution containing both cuprous chloride and cupric chloride, is cooled to a temperature of 20° C. to 30° C. whereby substantially all of the cupric chloride present, and which has been formed by the oxidation of the cuprous chloride, crystallizes from solution. The crystal slurry thus formed is separated from the mother liquors by means of a suitable suction filter or filter press or by using a centrifuge, the separation producing saturated aqueous solution of cupric chloride and a crystalline mass of cupric chloride containing from about 3% to 5% moisture. The cupric chloride crystals also have two mols of water of crystallization bound thereto.

The saturated aqueous solution of cupric chloride thus obtained is mixed with hydrochloric acid and is thus prepared as further solvent in which the cuprous chloride for the oxidation step is to be dissolved, and the cupric chloride crystals are dried and then cycled to the fusion step of the process.

In accordance with the novel process of this invention, chlorine of a high degree of purity is obtained quite readily while at the same time the novel process of this invention enables the desired oxidation to be effected with any convenient gaseous oxidizing agent, employing temperatures of from 20° C. to 100° C. It has also been observed that in the instant process the oxidation of the hydrochloric acid added is almost 100% complete. It is also of considerable economic importance that the desired conversion is effected with the application of only that amount of heat energy which is required to raise the temperature of the cupric chloride in the fusion step to a temperature of 400° C. to 600° C. and to bring it to a molten condition. The heat energy may, however, be recovered almost entirely since it may be employed for the evaporation of water where the process involves the use of relatively dilute hydrochloric acid solutions.

The advantages of the instant process are many and the more important are that chlorine is obtained directly in a highly purified form without the necessity for any subsequent purification treatment, the oxidation process is useful and effective employing either hydrogen chloride or aqueous hydrochloric acid of any available concentration, and, furthermore, that any available oxidizing agent is suitable, the most advantageous being either oxygen or air.

In order to illustrate this invention but without being limited thereto, the following examples are given:

Example I 500 parts by weight of dry cupric chloride are heated to a temperature of 600° C. to 650° C. and during the period the melt is heated to this temperature the decomposition of the molten cupric chloride yields 100 parts by weight of pure chlorine. The heating of the fused mass converts it to a mixture of 280 parts by weight of cuprous chloride and 120 parts by weight of unreacted cupric chloride. The molten mass is either employed in the molten state or is first cooled and then reduced in particle size and added to a solution of 150 parts by weight of cupric chloride and 150 parts by weight of hydrogen chloride in 700 parts by weight of water. At a temperature of 90° C. to 105° C. all of the cupric chloride and cuprous chloride in the molten mass produced by the fusion step is dissolved. Air or oxygen is then introduced into the resulting solution until all of the cuprous chloride present has been oxidized to cupric chloride. The solution is then cooled to a temperature of 20° C. to 25° C. The cupric chloride which precipitates from the solution is filtered off and then dried on a suction filter. The cupric chloride thus recovered is then cycled to the fusion step, as described, where it undergoes partial decomposition, as described, to yield the pure chlorine vapor. The mother liquors obtained after the cupric chloride crystals are removed is fortified by the addition of hydrochloric acid or hydrogen chloride and the desired concentration of acid produced and the resulting acid solution is then employed as the reaction medium for the next stage or oxidation cycle of the process in which it serves as the solvent for the recovered cuprous chloride which is to be oxidized.

Example II 540 kilos of cupric chloride and 210 kilos of potassium chloride are heated to a temperature of between 500° C. and 600° C. and this heating step produces 100 kilos of pure chlorine in the gaseous phase, together with about 3.3 kilos of copper salts which are carried along but which are removed by passing the chlorine gas through a vessel in which all of the solids either settle or are removed from the gas phase and leave the purified chlorine gas to be withdrawn. The molten 650 kilo mass remaining is brought into solution in a mixture of 594 kilos of hydrogen chloride and 650 kilos of a mixture of cupric chloride and potassium chloride in 2380 kilos of water. At a temperature of 90° C. to 105° C. a homogeneous solution is obtained and then either air or oxygen is passed through the solution in finely divided bubbles, until all of the cuprous chloride present has been converted to cupric chloride by the resulting oxidation. Upon cooling to a temperature of 20° C. to 25° C. a crystalline cupric chloride precipitate forms and the crystals are separated from the mother liquor by centrifuging. The crystalline mass recovered is a mixture of 540 kilos of cupric chloride and 210 kilos of potassium chloride. After this crystalline mass has been dried it is then available for the fusion cycle of the process. The mother liquors are mixed with 100 kilos of hydrogen chloride and the resulting solution is thereby made available for the oxidation cycle when the crystalline residue from the fusion cycle has been added. In the above process, the potassium chloride acts to suppress the volatilization of the copper salts and to reduce this volatilization to a minimum. Experience has shown that dry chlorine gas may be obtained without the use of potassium chloride and the volatilized copper salts carried along with the gases may be separated completely, but the use of potassium chloride acts to suppress the volatilization so that lesser quantities must be removed.

Example III

The process of this invention may be carried out in a continuous manner and this continuous process is illustrated by the accompanying drawing which comprises a flow sheet of such a continuous operation.

Referring now to the drawing, the fusion step is carried out in a quartz reactor tube 1 provided with an outlet 2 and a discharge orifice 2a, reactor 1 being maintained in a heater 7 which is adapted to provide and maintain a temperature in said reactor tube 1 of from 400° C. to 650° C. Cupric chloride for the fusion step is introduced into reactor 1 from a storage vessel 6 which passes the cupric chloride into vessel 5 through a suitable valve mechanism at the base of the storage vessel 6, the valve mechanism being timed to coincide with the rate of discharge of the molten charge from discharge orifice 2a. The gaseous chlorine formed in reactor 1 rises and is collected in vessel 3 from which it is passed through orifice 4 to a suitable device such as a cyclone separator (not shown) in which any copper salts present in the chlorine gas may be removed. The molten, fused mass of cuprous chloride and cupric chloride formed during the fusion is discharged from reactor 1 through orifice 2a into tower 9 which is filled with a 20% to 25% by weight aqueous solution containing both cupric chloride and hydrogen chloride, as heretoforedescribed. Tower 9 is connected in series to towers 10 and 11, which are also charged with the same aqueous solution, communication between the respective towers being provided by conduits 23 and 24.

The heat present in the molten mass entering the aqueous solution in tower 9 is removed by the resulting partial vaporization of the water in tower 9 and the steam thus formed leaves tower 9 through conduit 12 and is condensed in cooler 15. The condensate is then discharged to a vessel 17 through a separator 16. In order to replace the water removed from tower 9 because of the vaporization of the water, aqueous hydrochloric acid is added from an acid supply in vessel 8. The oxygen or air required for the oxidation of the cuprous chloride in the aqueous solution in towers 9, 10 and 11 is introduced into the system through a vessel 19, the air or oxygen entering through a pipe 22. The unreacted air or oxygen separated from the condensate in separator 16 is returned to vessel 19 through a pipe 18. The oxidizing gas from vessel 19 is passed through a conduct 20 to a pump or blower 21 and is then passed into tower 11 through line 26 where it is broken into fine bubbles and passes upwardly through the aqueous solution. The unreacted gases leave tower 11 through line 27 and are caused to flow countercurrently to the flow of the aqueous solution by being passed upwardly through the solution in tower 10, as shown, and then through line 28 and upwardly through the solution in tower 9. When the oxidation of the cuprous chloride is completed in tower 11, the cupric chloride solution formed is discharged through a conduit 25, and on to a cooling roll 30 where the drop in temperature causes the cupric chloride in solution to crystallize out and to drop off on to trough 31 in the form of a wet crystalline mass. The latter is discharged into a centrifugal separator 32, the crystalline cupric chloride removed then being dried in the dryer-blower 33 by means of hot air from the heater 34 and finally carried to the storage vessel 6 through line 29. The mother liquor separated in centrifuge 32 is returned by a pump 35 through line 14 to the oxidation tower 9. Thus, the process of this invention is adapted for continuous operation in the manner described.

It is to be understood, of course, that the process described is not limited to the use of the apparatus described above or to the specific copper salts utilized since the feature of the instant invention resides essentially in use of halogen metal salts which can be decomposed by fusion to yield the desired halogen and a halogen metal salt of a lower valence which can then be readily oxidized to a higher degree of valency, especially in aqueous solution and in the presence of the salt of higher valency and the corresponding hydrogen halide, and the oxidation product then readily separated for return to the fusion step of the cycle.

I claim:

A continuous process for the conversion of hydrogen chloride to elemental chlorine by the cyclic oxychlorination of cuprous chloride to cupric chloride followed by the heat fusion of cupric chloride having the steps which comprise: (1) heating cupric chloride to a temperature of from between 400° C. to about 650° C. to convert it to chlorine gas and a molten mixture of cupric chloride and cuprous chloride; (2) adding said molten mixture to an aqueous solution of hydrogen chloride containing cupric chloride to dissolve said molten mixture and thereby obtain a solution of cuprous chloride and cupric chloride at a temperature of above about 80° C.; (3) passing an oxygen-containing gas through the aqueous solution obtained in step 2, whereby the cuprous chloride is oxidized to cupric chloride; (4) cooling and crystallizing the aqueous solution obtained in step 3 to precipitate cupric chloride therefrom; (5) separating the resulting cupric chloride crystals from its mother liquor and recycling it for use in step 1; and (6) adding hydrogen chloride to the mother liquor recovered in step 5 and recycling the resultant solution for use in step 2.

References Cited in the file of this patent
UNITED STATES PATENTS

| | | |
|---|---|---|
| 2,418,931 | Gorin | Apr. 15, 1947 |
| 2,468,766 | Low | May 3, 1949 |
| 2,666,024 | Low et al. | Jan. 12, 1954 |

OTHER REFERENCES

Mellor: A Comprehensive Treatise on Inorganic and Theoretical Chemistry, vol. 3, page 158, Longmans, Green and Co. (1923).